United States Patent
Hjort et al.

[15] 3,652,999
[45] Mar. 28, 1972

[54] DEVICE FOR VISUALIZING MEASURED QUANTITIES

[72] Inventors: Bo Hjort, Sollentuna; Kurt K. H. A. Berglund, Solna, both of Sweden

[73] Assignee: Siemens Aktiengesellschaft, Erlangen, Germany

[22] Filed: Apr. 13, 1970

[21] Appl. No.: 27,878

[52] U.S. Cl. ....................................................340/172.5
[51] Int. Cl. ..............................................................G06f 3/14
[58] Field of Search ..................340/172.5, 324 A; 235/197, 235/198

[56] References Cited

UNITED STATES PATENTS 3,406,387  10/1968  Werme ..................................340/324

*Primary Examiner*—Raulfe B. Zache
*Attorney*—Richards & Geier

[57] ABSTRACT

A device for making visible analogous time dependent measured quantities, for example, of an electrocardiogram by an electronic ray upon a screen, uses an analog digital converter to produce derived digital measured values. The device also uses at least one image repeating storer in which is stored a predetermined amount of measured quantities as individual digital measured values. These values are obtained from the storer in cycles and are delivered through a digital analog converter and a time deflecting device synchronized with the storer. The deflecting device periodically deflects the electronic ray with reference to the time axis of the screen. The present invention is particularly characterized in that the individual digitally stored measured values after conversion are transmitted as deviating voltage perpendicularly to the time axis upon a cathode ray oscillograph inscribing with brightness which remains uniform. The inscribing ray is key-darkened during its guided return to the initial position by the time deflecting device.

10 Claims, 3 Drawing Figures

DEVICE FOR VISUALIZING MEASURED QUANTITIES

This invention relates to a device for making visible analogous time dependent measured quantities, for example, of an electrocardiogram, by an electronic ray upon a screen. Use is made of an analog digital converter to produce derived digital measured values and of at least one image repeating storer in which is stored a predetermined amount of measured quantities as individual digital measured values. They are questioned cyclically and are delivered through a digital analog converter and a time deflecting device synchronized with the storer. The deflecting device periodically deflects the electronic ray with respect to the time axis of the screen.

Known devices of this type operate according to the process of light intensity modulation common in optics, namely, the inscribing ray is always lit for a short while only at the moment when a measured value is delivered from the storer. Then the image of a measured value appears upon the screen as a row of light points located close to each other.

Drawbacks of these devices operating with light intensity are caused by the fact that lengths of pulses for the impulses required for lightness control of the inscribing ray are located in the range of so-called nanoseconds. Thus a precise focus adjustment is not possible any more, so that the image point is widened and then the entire image becomes blurred. Furthermore, the process of light intensity modulation requires a bright light intensity at the moment of key operated light appearance, so that there is the danger that the screen may be burned by sparks.

An object of the present invention is to eliminate these drawbacks.

Other objects will become apparent in the course of the following specification.

In the accomplishment of the objectives of the present invention it was found desirable to transmit the individual digitally stored measured values after conversion as steered voltage perpendicularly to the time axis upon a cathode ray oscillograph inscribing with brightness which remains uniform. The inscribing ray is key-darkened during its guided return into the initial position by the time deflecting device. When the inscribing takes place with uniform brightness, the focus of the inscribing ray can be adjusted very precisely. The result is a clear image which is not blurred. The danger of burning is effectively eliminated.

In accordance with the present invention the operation of the storer is preferably so set that each individual measured value delivered into the storer is again removed from the storer after a number of storage cycles corresponding to the number of storer positions. This makes it possible to continuously write in new measured values into the storer. The storer and its actuating device are then so constructed that when new measured values are introduced all the stored measured values are shifted to the extent of one position and the oldest measured values are cancelled. In this construction the image moves slowly across the screen.

Furthermore, the storer and its actuating device are so constructed that the stored measured values can be cyclically delivered as often as desired and then stored in again, without storing new measured values or removing the old ones. This makes it possible to provide a standing image for any desired time period.

The actuation of the storer can be also so constructed that the storer can be read off with higher speed than the supply of new measured values, so that the measured values continuously removed from the storer are shifted stepwise from the outlet of the storer to its inlet. This makes it possible to move without steps from a delayed inscription to one which is not delayed.

It is also advantageous to transmit the measured values removed from the storer to a writing instrument with an inscribing carrier for permanent registration. The operation of the writing instrument and of the storer should be so synchronized that when there is a shift from the delayed written measured values to those written without delay (present values) the image frequency of the storer and the speed of the inscribing member of the writing instrument should be correspondingly increased until the given out measured values correspond to the undelayed measured values (storer introduction). This provides the possibility of inscribing by means of the writing instrument not only the delayed curve but also the present actual curve, which is particularly advantageous for the supervision of heart cardiograms. The change from delayed written measured values to those written without delay can be carried out by hand, for example, by pressing a release key, or can be carried out automatically by the use of suitable curve testing devices.

It is also advantageous to provide an actuating device with an additional image repeat storer by means of which old measured values are continuously compared with new measured values, whereby when there are differences between the compared measured values the image part containing the differences is raised or set off relatively to the other parts of the image. This takes place preferably by increasing the brightness, the width or the amplitude of the image part. If the image part containing the deviations is to be set off by widening, this can be accomplished by superposing during the duration of the image part to be set off the deviating voltage perpendicular to the time axis with an alternating voltage having a substantially greater frequency than the image frequency. The setoff image part travels with the inscribed image across the screen of the oscillograph.

To make visible a plurality of time-dependent measuring values upon the screen, a corresponding number of image repeating storers is provided, the inlets of which are fed one after the other with consecutive analog digitally transformed measured values, while the outlets deliver the stored information also in timely sequence to the oscillographs as vertically deviated voltages. The deviated voltages are always superposed over a preliminary voltage corresponding to the vertical shifting of the image curves. The number of time-dependent measured values capable of appearing as images depends substantially from the available space upon the screen.

The invention will appear more clearly from the following detailed description when taken in connection with the accompanying drawings showing by way of example only, preferred embodiments of the inventive idea.

Figure 1:
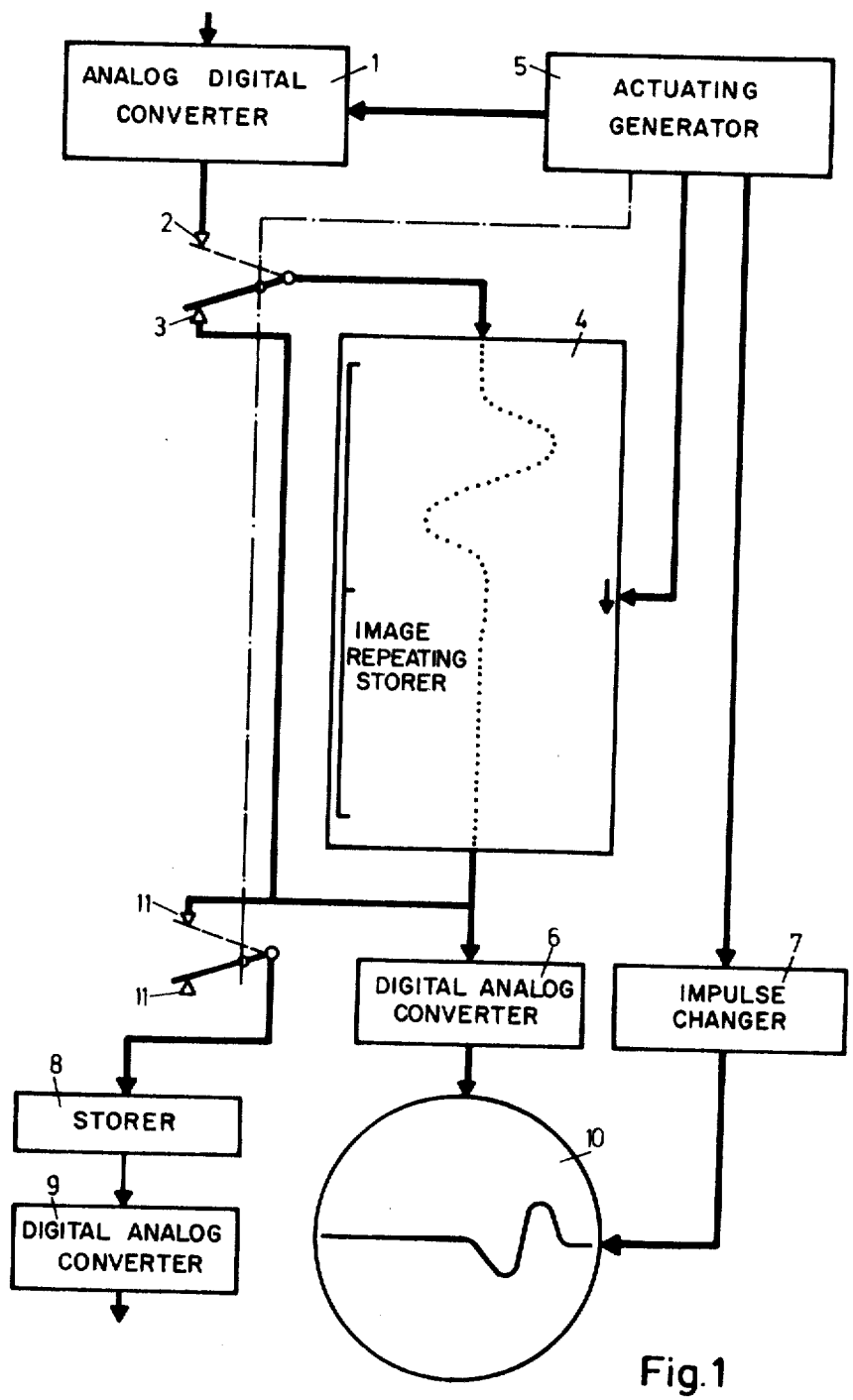
FIG. 1 is a basic circuit diagram of the device of the present invention for visualizing a single analog appearing time-dependent measured value.

In accordance with FIG. 1 an analog measured value the time-continuation of which is to be measured, is supplied to the analog-digital converter 1. The outlet of the converter 1 produces digital measured values at time intervals of 20 msec. While this repetition or test frequency is too low for a mathematic treatment of the measured values which are here investigated, particularly biophysical measured values, it is sufficient for supervision purposes.

The outlet of the converter 1 can be connected by a fixed contact 2 of a switching contact 2,3 with the inlet of an electronic image repeating storer 4 which in this example is a dynamic storer-register. The inlet of the storer 4 can be connected by the second contact 3 of the switching contact 2,3 with the outlet of the same storer. The converter 1, the switching contact 2,3 as well as the storer 4 are operated by actuating impulses produced by an actuating generator 5. The storer 4 has a total of 500 positions (storing positions) for each group of eight binary indicia. This means that there are ±128 level possibilities for each position and a total inflow time of 500×20 msec. = 10 sec.

A measured value supplied to the inlet of the storer 4 is inscribed in the first position of the storer 4 and is then transmitted from position to position. The transmission takes place at time intervals of 40 μsec. each, so that a measured value inscribed in the first position of the storer 4 reaches the storer outlet after a total of 500×40 μsec. = 20 msec. and is then returned to the storer inlet through the switching contact 2,3 which is moved to position 3. The repeated introduction of the measured value into the storer 4 takes place in the second position since a new measured value has already been introduced into the first position. The storer 4 is actuated by the generator 5 in such manner that each measured value is transmitted altogether 500 times cyclically through the storer 4. When the measured value has reached for the 500th time the outlet of the storer 4, it is not returned any more to its inlet since at that time the connection between the inlet and the outlet of the storer by the switching contact 2,3 is interrupted. The described cyclic circulation of the measured values in the storer 4 makes it possible to read the entire content of the storer 4, namely, all fed in measured values, cyclically in time sequence at the storer outlet at intervals of 20 msec. The testing or reading speed amounts to 40 μsec. per measured value.

The outlet of the storer 4 is connected through a digital-analog converter 6 to the Y-deflecting plates of a cathode ray oscillograph 10. Each of the 500 digital measured values used during a storer cycle is again transformed in the converter 6 into an analogous voltage which represents the corresponding Y-deviating voltage of the oscillograph. Furthermore, an impulse changer 7 which is operated by the actuating impulses of the generator 5, is connected to the X-deviating plates. The impulse changer 7 produces a deviating voltage dependent upon the actuating impulses. This voltage periodically deflects the electron ray in the X-direction. The duration of the deflection amounts to 20 msec. The X-deflection can be stepwise. This means that in the example set forth herein, the deflection is composed of 500 steps of a total deviation of 20 msec. However, the deflecting voltage can also rise continuously during the entire duration of 20 msec.

The device which is thus constructed, namely, which has a total delivery time of 20 msec. for all measured values stored in the storer 4 during each cycle and which has a reading speed of 40 μsec. per measured value, produces an image curve upon the screen of the oscillograph which moves with a speed of 20 msec. per position. In the case of 500 positions along a screen width of 25 cm., the speed of movement will amount to 25 mm./sec. with a part of the initially analog curve visible for a total of 10 sec.

If the number of steps of the storer cycle is brought to coincide with the number of storer positions, then the entire information runs in the storer without any position shifting. Then the screen will have an immovable image for a total of 10 sec. of the analog curve given to the storer, so that the image can be used for observation of parts of the curve and measurement.

The outlet of the storer 4 can be also connected with the inlet of a second storer 8 by a switching contact 11 which is operated by the generator 5 in synchronism with the switching contact 2,3. The storer 8 is provided for receiving those measured values which are removed every 20 msec. from the storer 4 when a new measured value is introduced into the storer 4. The outlet of the storer 8 is connected to a digital-analog converter 9 which supplies these measured values after a digital-analog conversion to a writing instrument (not shown) having a writing element for inscribing an analog curve delayed by 10 sec. relatively to the original one.

The operations of the storer 4 and of the writing instrument are so synchronized that when there is a change from delayed inscribed measured values to measured values inscribed without delay (actual values) the image frequency of the storer 4 and the speed of the writing element can be correspondingly increased until the measured values delivered by the storer 4 correspond to the undelayed measured values (storer inflow).

A sample recognizing device (curve testing device) can determine, for example, whether an electrocardiogram contains a change in rhythm, the observation of which is most important and which possibly should be automatically inscribed. By way of example, when this change in rhythm takes place, the device can issue a warning signal which can be transmitted to a device which will intensively modulate the electron ray during the duration of the warning signal. The produced increase in intensity follows the abnormality during its movement across the oscillograph screen. This device can be constructed as a simplified circulation storer corresponding to the storer 4. Instead of providing an intensity modulation the warning device can produce during the duration of the warning a vertically deviating high-frequency voltage which is superposed upon the vertically deviating voltage produced from the measured values and which will cause an increase in the width of the corresponding curve portion.

Figure 2:
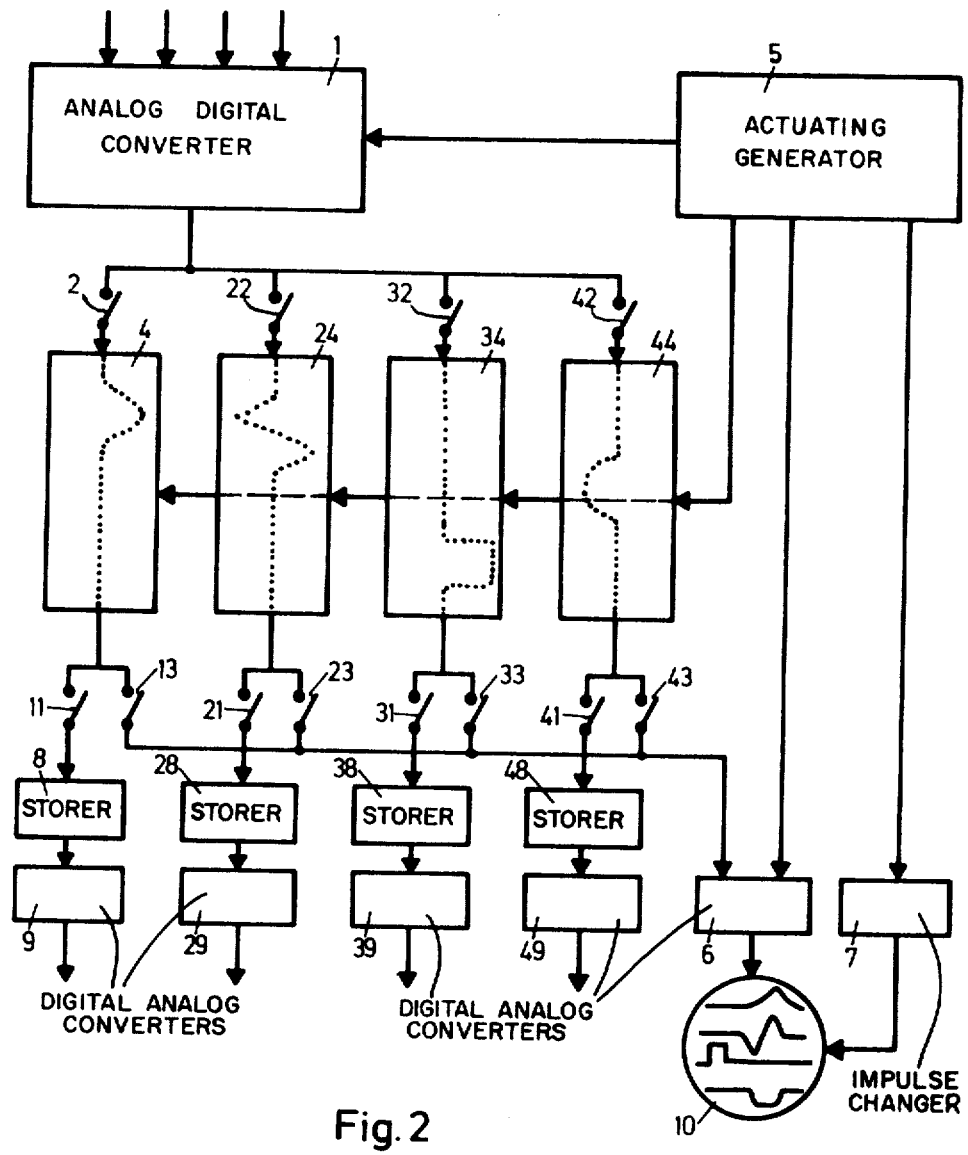
FIG. 2 is a basic circuit diagram of the present invention for visualizing a plurality of different time-dependent measured values.

The device of the present invention can be also so constructed that it makes visible a plurality of time dependent measured values upon the same screen. FIG. 2 shows such a construction wherein a total of four analog time dependent measured values are transformed into digital measured values in the same analog digital converter 1' and are transmitted to one of the four storer units 4', 24, 34 and 44. The steering generator 5', the digital analog converter 6' for the Y-deviation, the impulse changer 7' for the X-deviation, the additional storer 8', 28, 38 and 48 with outlets connected to digital analog converters 9', 29, 39 and 49 operate in principle substantially in the same manner as has been described already in connection with the device shown in FIG. 1. The only new feature is that the converter 6' is additionally so constructed that it superposes a prevoltage corresponding to the vertical shifting of each image curve upon vertically deviating voltages resulting from the measured values depending upon the actuating impulses of the generator 5'. The switches 2', 22, 32 and 42 connect when closed the inlets of the respective storers 4', 24, 34 and 44 with the outlet of the converter 1'. Correspondingly, the switches 11', 21, 31 and 41 connect when closed the outlets of the respective storers 4', 24, 34 and 44 with the storers 8', 28, 38 and 48 which are connected to converters 9', 29, 39 and 39. The switches 13, 23, 33 and 43 when closed connect the outlets of the storers 4', 24, 34 and 44 with the digital analog converter 6. The drawing does not show return conduits of the storers for the sake of clarity of illustration.

Figure 3:
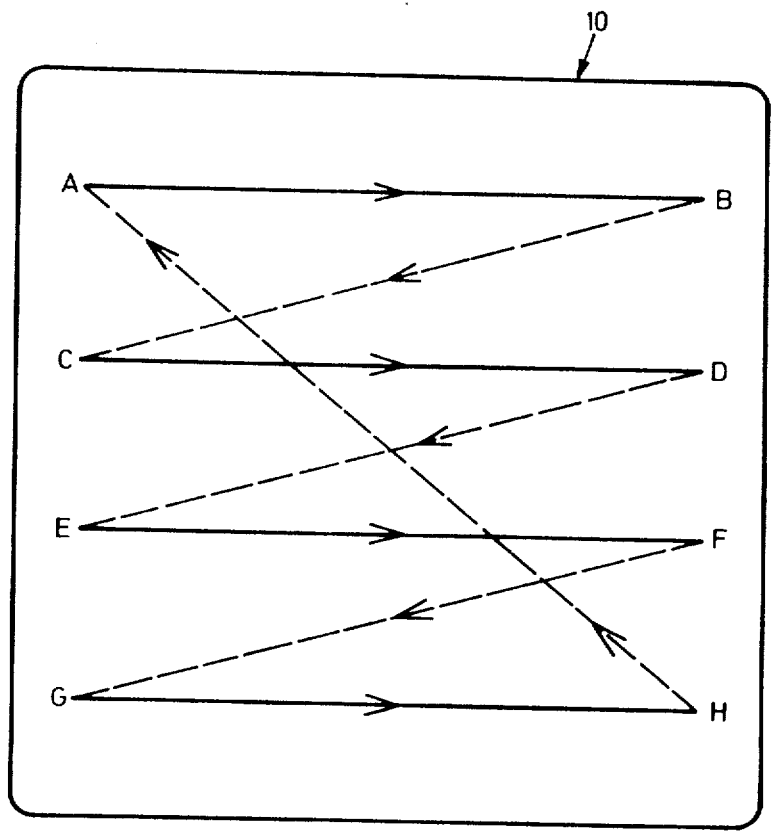
FIG. 3 illustrates the deviation of electron rays upon a screen for the purpose of explaining the operation of the circuit of FIG. 2.

FIG. 3 illustrates the operation of the device of FIG. 2 as follows:

The testing frequency amounts to 20 msec. for each individual measured value. The stored content of the storer 4 is keyed off during 5 msec. along the length A-B in FIG. 3, the stored content of the second operation is keyed off during the following 5 msec. along the length CD, and so on. As soon as the storer 44 has been used and inscribed upon the length G-H, the electron ray moves back to the point A. The horizontal deviations of the electron ray are steered by the generator 5'. Each stored information is three times represented upon the oscillograph screen with unvarying brightness. Each fourth time, that is, every 20th millisecond, all measured values are shifted in their storers to the extent of one position while at the same time a new measured value is supplied to the corresponding circulating storers.

We claim:

1. A device for making visible analogous time dependent measured quantities, such as those of an electrocardiogram by an electronic ray upon a screen, said device having an analog digital converter producing derived digital measured values, at least one image repeating storer connected with the output of said analog digital converter and wherein a predetermined amount of measured quantities is stored as individual digital measured values, a digital analog converter, said values being obtained from said storer in cycles and delivered to and through said digital anolog converter, and a time-deflector connected with the output of said digital analog converter and synchronized with said storer for periodically deflecting the electronic ray relatively to the time axis of said screen, said device being particularly characterized by a cathode ray oscillograph inscribing with unvariable brightness, means supplying the individual digitally stored measured value after conversion as deviating voltage perpendicularly to the time axis of said oscillograph, and means extinguishing the inscribing ray while returning it to its initial position through the time-deflector.

2. A device in accordance with claim 1, comprising means actuating said storer, the storer and the last-mentioned means withdrawing cyclically at will the stored measured values and reintroducing them without the introduction of new measured values or extinguishing of old ones.

3. A device in accordance with claim 1, comprising an additional image repeating storer between the analog digital converter and the cathode ray oscillograph and means operating the last-mentioned storer for continuously comparing old measured values with new ones and indicating an image containing deviations from the compared measuring values by increasing its brightness, width or amplitude.

4. A device in accordance with claim 3, having an AC generator with a frequency substantially higher than the image frequency and switching means actuated by the last-mentioned means for adding alternating voltage to the deviating voltage perpendicularly to the time axis during the duration of the image portion being set off.

5. A device in accordance with claim 1, comprising a plurality of image repeating storers, the number of said image repeating storers corresponding to the number of a plurality of time dependent measuring values to be visible upon the screen, said image repeating storers having inlets receiving one after the other in time sequence analog digitally converted measuring values, and having outlets with switched digital analog converters delivering the storer information also in time sequence as vertical deviating voltages to said oscillograph with a prevoltage being superposed corresponding to the perpendicular shifting of each image curve.

6. A device in accordance with claim 1, comprising a steering generator for steering the rotary speed of said image repeating storer and means actuated by said generator for removing each individual measured value supplied to the storer out of the storer after a number of storer cycles corresponding to the number of storer positions.

7. A device in accordance with claim 6, comprising a writing instrument connected to the output of the storer having an inscriber and receiving the removed measured values.

8. A device in accordance with claim 7, having means connected to the storer and inscriber and operative when transferring from measured values inscribed with delay to measured values inscribed without delay to increase correspondingly the image frequency of said storer and the speed of said inscriber until the delivered measured values correspond to measured values inscribed without delay.

9. A device in accordance with claim 6, wherein in the image repeating storer after the introduction of a new measured value all stored measured values are shifted to the extent of one position, the storer having means extinguishing the oldest measured value.

10. A device in accordance with claim 6, wherein the steering generator comprises means increasing the speed of the storer so that it can be read with higher speed than that of the introduction of new measured values, so that the measured values continuously removed from the storer are shifted stepwise from the outlet of the storer to its inlet.

* * * * *